(12) United States Patent
Namba et al.

(10) Patent No.: US 9,662,789 B2
(45) Date of Patent: May 30, 2017

(54) ROBOT SYSTEM AND ROBOT CONTROLLER

(71) Applicant: KABUSHIKI KAISHA YASKAWA DENKI, Kitakyushu-shi (JP)

(72) Inventors: Taro Namba, Kitakyushu (JP); Tomohiro Ueno, Kitakyushu (JP); Osamu Yoshida, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 454 days.

(21) Appl. No.: 14/499,274

(22) Filed: Sep. 29, 2014

(65) Prior Publication Data
US 2015/0314438 A1   Nov. 5, 2015

Related U.S. Application Data

(63) Continuation of application No. PCT/JP2012/058983, filed on Apr. 2, 2012.

(51) Int. Cl.
   G05B 19/04    (2006.01)
   G05B 19/18    (2006.01)
   (Continued)

(52) U.S. Cl.
   CPC .............. B25J 9/161 (2013.01); B25J 9/163 (2013.01); B25J 9/1656 (2013.01);
   (Continued)

(58) Field of Classification Search
   CPC .......... B25J 9/161; B25J 9/163; B25J 9/1656; G05B 19/0426; G05B 2219/32145;
   (Continued)

(56) References Cited

U.S. PATENT DOCUMENTS 4,901,218 A * 2/1990 Cornwell ........... G05B 19/4185
                                                   340/3.1
5,822,207 A * 10/1998 Hazama ................. B25J 9/1666
                                                   700/104
(Continued)

FOREIGN PATENT DOCUMENTS

CN    1715010    1/2006
CN    1721143    1/2006
(Continued)

OTHER PUBLICATIONS

Ma et al., "Teleoperation System of Internet-Based Multi-Operator Multi-Mode Manipulator", Proceedings of 2010 International Conference on Electrical and Control Engineering (ICECE), Jun. 2010, pp. 2236-2240.

(Continued)

Primary Examiner — Harry Oh
(74) Attorney, Agent, or Firm — Mori & Ward, LLP (57) ABSTRACT

This disclosure discloses a robot system including one or more work facilities and a teaching information database. The work facilities comprise a robot and robot controller. The robot controller controls the movement of the robot based on teaching information stored in a storage part. The teaching information database stores a plurality of types of the teaching information associated with work information. Each work facility includes an interface device configured to receive an input of search condition information, to search teaching information highly relevant to the search condition information among the plurality of types of teaching information, and to receive a selection of desired teaching information among one or more sets of the teaching information hit in the search. The robot system further comprises a first transferring part configured to transfer the teaching (Continued)

information from the teaching information database to the storage part.

8 Claims, 6 Drawing Sheets

(51) Int. Cl.
*B25J 9/16* (2006.01)
*G05B 19/042* (2006.01)

(52) U.S. Cl.
CPC ............... *G05B 19/0426* (2013.01); *G05B 2219/32145* (2013.01); *G05B 2219/34039* (2013.01); *G05B 2219/37445* (2013.01); *G05B 2219/40102* (2013.01); *Y02P 90/10* (2015.11); *Y10S 901/03* (2013.01)

(58) Field of Classification Search
CPC .......... G05B 2219/37445; G05B 2219/34039; G05B 2219/40102; Y02P 90/10; Y10S 901/03
USPC ........................................................ 700/257
See application file for complete search history.

(56) References Cited

U.S. PATENT DOCUMENTS

| | | | |
|---|---|---|---|
| 2003/0014149 A1* | 1/2003 | Kreidler | G05B 19/042 700/169 |
| 2003/0088534 A1* | 5/2003 | Kalantar | G06Q 10/06 706/50 |
| 2004/0006611 A1* | 1/2004 | Yi | H04L 12/18 709/222 |
| 2006/0009878 A1 | 1/2006 | Kobayashi et al. | |
| 2006/0015218 A1 | 1/2006 | Nagatsuka et al. | |
| 2008/0243305 A1 | 10/2008 | Lee et al. | |
| 2009/0306823 A1 | 12/2009 | Baltes et al. | |
| 2010/0241693 A1* | 9/2010 | Ando | G08C 17/00 709/203 |
| 2011/0161967 A1* | 6/2011 | Horiyama | H04N 1/00344 718/102 |

FOREIGN PATENT DOCUMENTS

| | | |
|---|---|---|
| JP | 2002-123394 | 4/2002 |
| JP | 2004-237364 | 8/2004 |
| JP | 2008-021239 | 1/2008 |
| JP | 2009-262279 | 11/2009 |
| WO | WO 2010/071384 | 6/2010 |

OTHER PUBLICATIONS

Japanese Office Action for corresponding JP Application No. 2014-508941, Sep. 29, 2015.
Extended European Search Report for corresponding EP Application No. 12873504.0-1807, Jan. 20, 2016.
Chinese Office Action for corresponding CN Application No. 201280072198.3, Jan. 28, 2016.
Chinese Office Action for corresponding CN Application No. 201280072198.3, May 27, 2015.
International Search Report for corresponding International Application No. PCT/JP2012/058983, Jul. 3, 2012.
Written Opinion for corresponding International Application No. PCT/JP2012/058983, Jul. 3, 2012.

* cited by examiner

TEACHING INFORMATION DATABASE — 2030

| | USAGE | WORK TARGET | TYPE | ... |
|---|---|---|---|---|
| TEACHING INFORMATION 001 | HANDLING | WORK 00A | TYPE A01 | ... |
| TEACHING INFORMATION 002 | HANDLING | WORK 00B | TYPE A02 | ... |
| ... | ... | ... | ... | ... |
| TEACHING INFORMATION 101 | BOLT TIGHTENING | WORK 10A | TYPE B01 | ... |
| TEACHING INFORMATION 102 | BOLT TIGHTENING | WORK 10B | TYPE B02 | ... |
| ... | ... | ... | ... | ... |
| TEACHING INFORMATION 201 | PAINTING | WORK 20A | TYPE C01 | ... |
| TEACHING INFORMATION 202 | PAINTING | WORK 20B | TYPE C02 | ... |
| ... | ... | ... | ... | ... |
| TEACHING INFORMATION 301 | WELDING | WORK 30A | TYPE D01 | ... |
| TEACHING INFORMATION 302 | WELDING | WORK 30B | TYPE D02 | ... |
| ... | ... | ... | ... | ... |
| TEACHING INFORMATION 401 | COMMUNICATION | WORK 40A | TYPE E01 | ... |
| TEACHING INFORMATION 402 | COMMUNICATION | WORK 40B | TYPE E02 | ... |
| ... | ... | ... | ... | ... |

FIG. 6

ROBOT SYSTEM AND ROBOT CONTROLLER

CROSS-REFERENCE TO RELATED APPLICATION

This is a continuation application of PCT/JP2012/058983, filed Apr. 2, 2012, which was not published under PCT article 21(2) in English.

BACKGROUND OF THE INVENTION

Field of the Invention

The present disclosure relates to a robot system and a robot controller.

Description of the Related Art

Japanese patent laid-open 2008-21239 discloses a robot teaching system.

SUMMARY OF THE INVENTION

According to one aspect of the present disclosure, there is provided a robot system comprising one or more work facilities and a teaching information database. The one or more work facilities comprise a robot and robot controller. The robot controller comprises a storage part configured to store teaching information for regulating a movement of the robot and is configured to control the movement of the robot based on the teaching information stored in the storage part. The teaching information database is data-communicably connected to each of the one or more work facilities and stores a plurality of types of the teaching information associated with work information including at least usage information of the robot. Each work facility includes an interface device configured to receive an input of search condition information related to a usage of the robot, to search teaching information highly relevant to the search condition information inputted among the plurality of types of teaching information stored in the teaching information database, and to receive a selection of desired teaching information among one or more sets of the teaching information hit in the search. The robot system further comprises a first transferring part configured to transfer the teaching information selected by the interface device from the teaching information database to the storage part of a corresponding work facility.

DETAILED DESCRIPTION OF THE EMBODIMENTS

An embodiment will now be described with reference to accompanying drawings.

Figure 1:
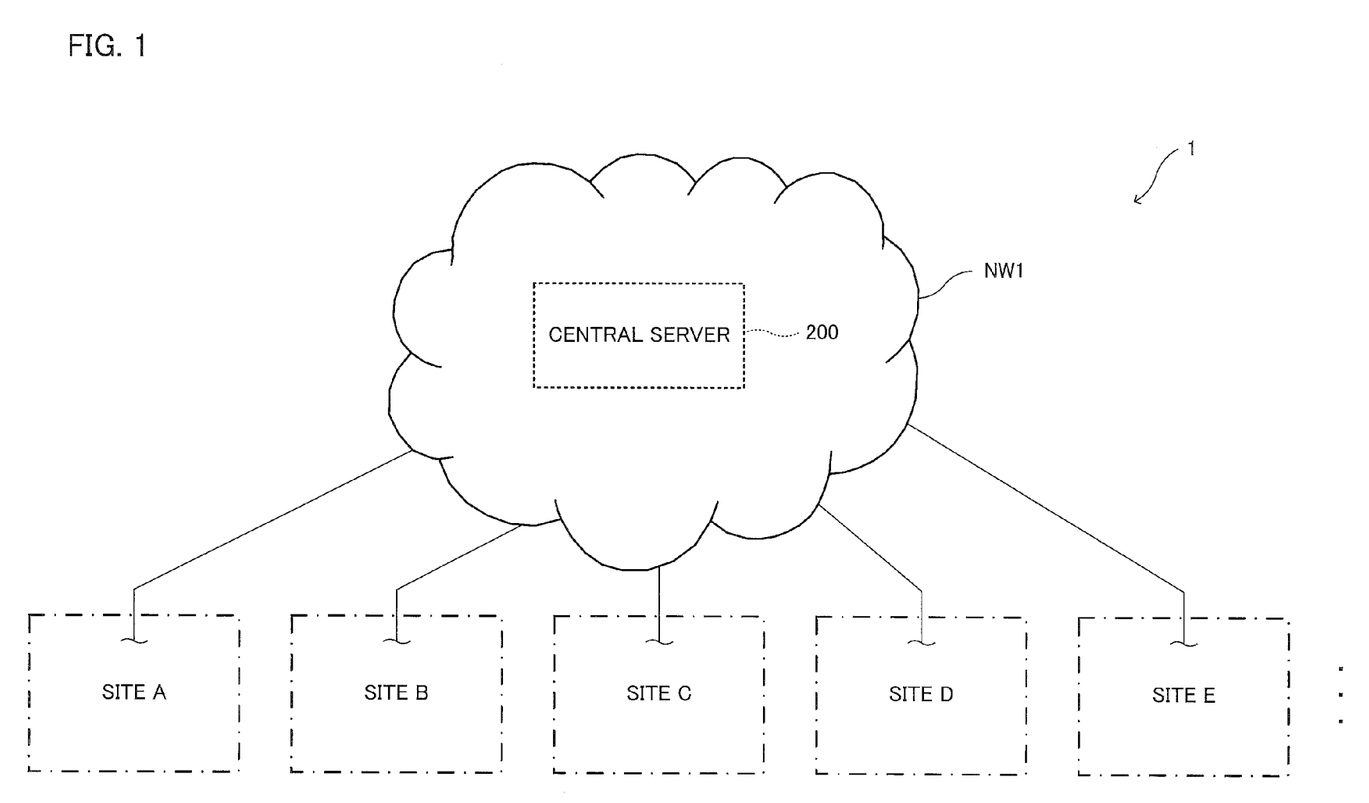
FIG. 1 is a system configuration diagram schematically showing the overall configuration of a robot system in an embodiment.
Figure 2:
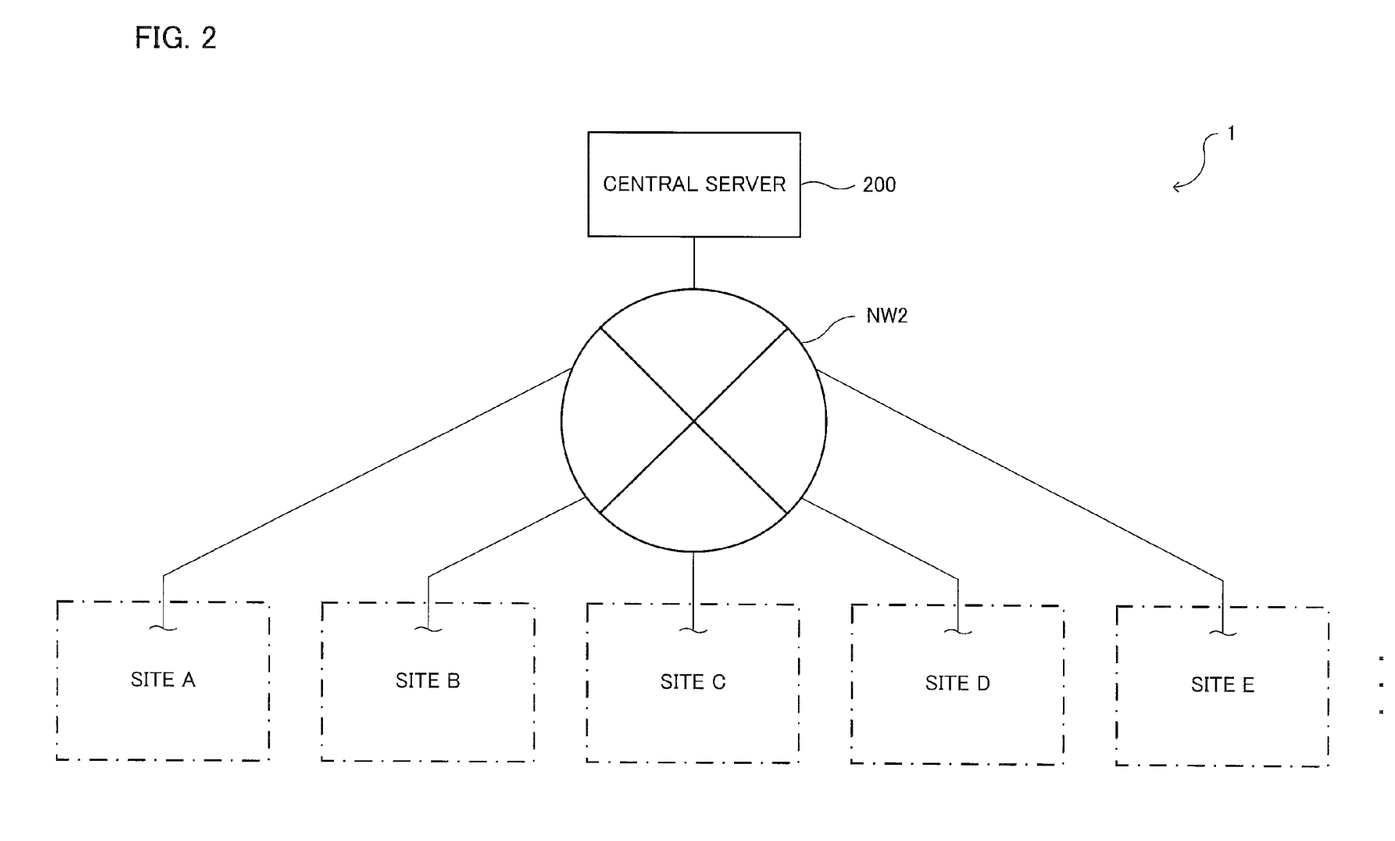
FIG. 2 is an explanatory view showing another example of the central server.

As shown in FIG. 1, a robot system 1 in this embodiment comprises a plurality of work facilities 100 (not shown in FIG. 1; refer to FIG. 3 described later) respectively disposed in a predetermined plurality of sites (described as "Site A" "Site B" "Site C" "Site D" "Site E" . . . in FIG. 1), and a central server 200. The central server 200 is a server common to (shared by) the work facilities 100 of the plurality of sites. This central server 200 is configured as an aggregate of one or more computation devices and storage devices linked by a network cloud NW1, and is data-communicably connected to each of the plurality of work facilities 100. Note that, as shown in FIG. 2, a single computation device connected to the respective work facilities 100 via a suitable network NW2 may be used as the central server 200. In this case, the central server 200 is installed in an office building or the like of a proprietary company of the robot system 1, for example.

Hence, a robot 110 (refer to FIG. 3 described later) of a type applicable to at least one of a predetermined plurality of types of applications is disposed as a part of the work facility 100 in each of the plurality of sites. Possible usages of the robot 110 include handling, bolt tightening, painting, welding, communication including dialog with a person, and the like, for example. Then, in each of the plurality of sites, work corresponding to the usage of the robot 110 is performed by the robot 110.

Figure 3:
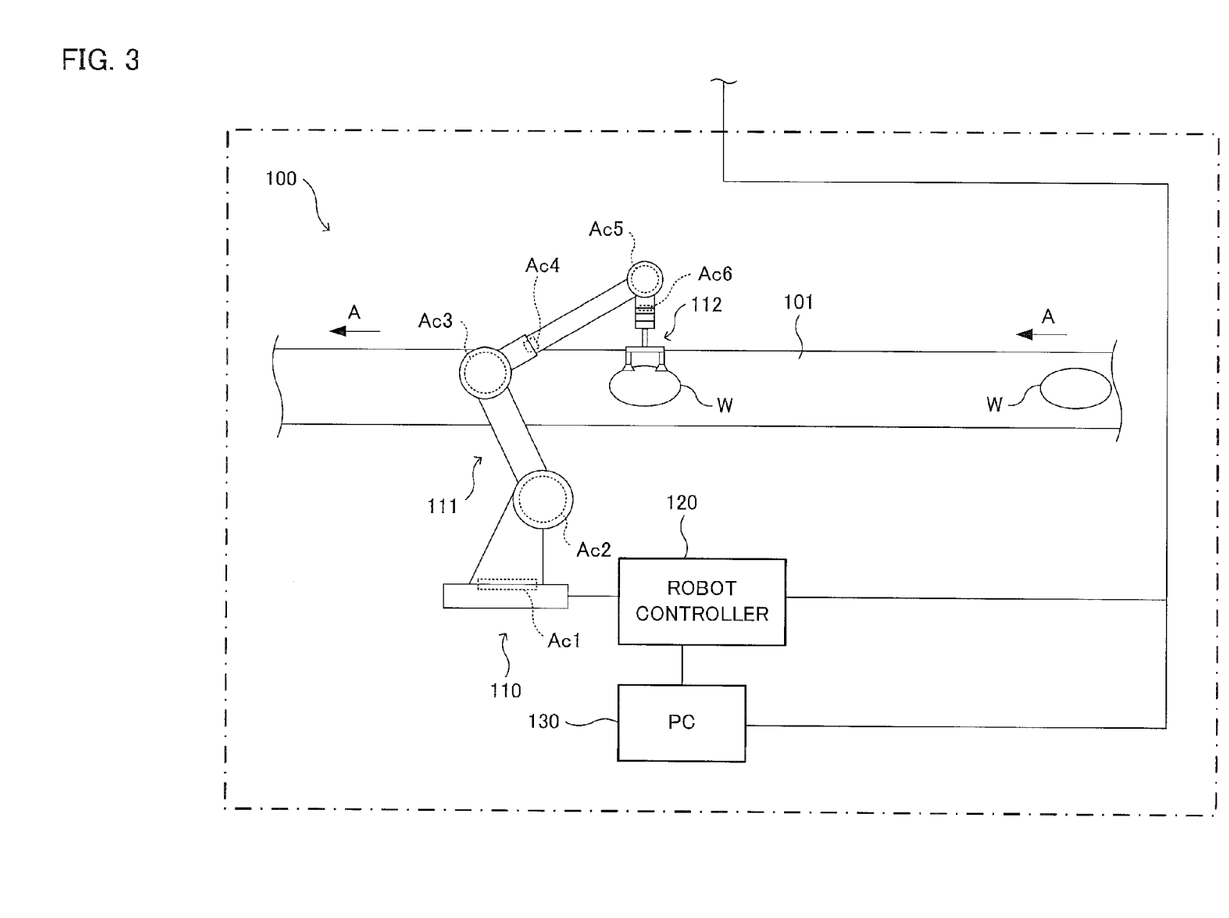
FIG. 3 is an explanatory view schematically showing the work facility of a site that performs handling work.

The following describes an example of the work facility 100 disposed in a site that performs handling work by the robot 110, using FIG. 3.

As shown in FIG. 3, a conveyor 101 that feeds a work W in a predetermined transport direction (the direction indicated by arrow A in FIG. 3) is disposed in this site. Further, the robot 110, a robot controller 120 (robot controller), and a personal computer 130 (interface device; hereinafter abbreviated "PC 130") are disposed as the work facility 100 in this site. The robot controller 120 and the PC 130 are intercommunicably connected to each other via a suitable line, and are data-communicably connected to the above described central server 200 via the above described network cloud NW1. The personal computer 130 links to means for receiving an input of search condition information, for searching teaching information, and for receiving a selection of desired teaching information, described in claims.

The robot 110 performs handling work that holds and transfers the work W, which is a work target, continuously and successively fed by the conveyor 101. This robot 110 comprises an arm 111 and actuators Ac1, Ac2, Ac3, Ac4, Ac5, Ac6, each constituting a servo motor for driving this arm 111. A suction-type hand 112 capable of lifting the work W by vacuum suction is attached to the tip end of the aim 111. Further, while not shown in FIG. 3, a tool 112 (such as a servo hand, fork-type hand, or chuck-type hand, for example) that is a different type from the suction-type hand 112 is disposed near the robot 110. The robot 110 performs a tool replacement movement using an ATC (Auto Tool Changer) or the like, making it possible to replace the tool 112 on the tip end of the arm 111.

The robot controller 120 is intercommunicably connected to the servo motors of the respective actuators Ac1-Ac6 disposed on the above described aim 111, and controls the driving of the respective servo motors. With this arrangement, the overall movement of the respective actuators Ac1-Ac6, that is, the movement of the robot 110, is controlled. Further, the robot controller 120 controls the movement (such as turning a vacuum device (not shown) ON and OFF in order to change the suction part of the suction-type hand 112 to a vacuum state, for example) of the tool 112 attached to the tip end of the above described arm 111.

The PC 130 is a device used by the instructor to create, edit, and search for teaching information (described later) that regulates the movement of the robot 110.

Figure 4:
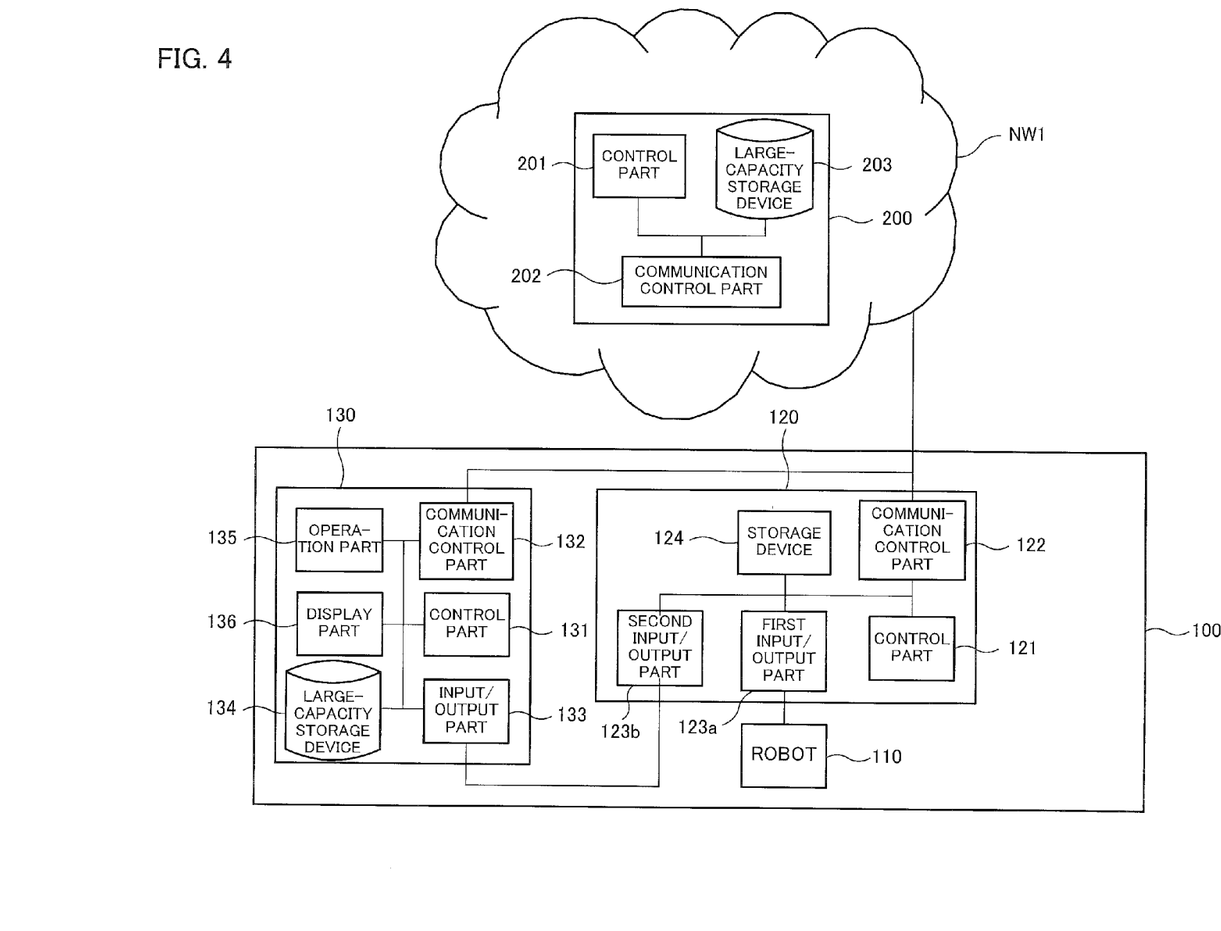
FIG. 4 is a functional block diagram showing the functional configuration of the work facility of a site that performs handling work and the central server.

As shown in FIG. 4, the robot controller 120 of the work facility 100 disposed in the site shown in the above described FIG. 3 comprises a control part 121, a communication control part 122, a first input/output part 123a, a second input/output part 123b, and a storage device 124 (storage part) as a functional configuration.

The communication control part 122 controls the information communication performed with the central server 200 via the network cloud NW1.

The first input/output part 123a controls the information communication performed with the robot 110.

The second input/output part 123b controls the information communication performed with the PC 130.

The storage device 124 comprises an HDD (Hard Disk Drive) and the like, for example, and stores various information. For example, the storage device 124 stores teaching information (described later) that regulates the movement of the robot 110, created or edited by the PC 130 or transferred from a teaching information database 2030 described later of the central server 200.

The control part 121 controls the entire robot controller 120. For example, the control part 121 controls the driving of the above described respective servo motors of the robot 110, controls the movement of the above described tool 112, and the like based on the teaching information stored in the storage part 124, thereby controlling the movement of the robot 110.

Further, the PC 130 comprises a control part 131, a communication control part 132, an input/output part 133, a large-capacity storage device 134, an operation part 135 (condition input part, teaching selection part, teaching input part), and a display part 136 as a functional configuration. The control part 131 links to means for transferring the teaching information selected by the interface device, described in claims.

The control part 131 controls the entire PC 130.

The communication control part 132 controls the information communication performed with the central server 200 via the network cloud NW1.

The input/output part 133 controls the information communication performed with the robot controller 120.

The operation part 135 comprises keys, buttons, switches, and the like that the instructor operates to input various information. The instructor suitably operates this operation part 135 to create teaching information and edit the teaching information stored in the storage device 124 of the robot controller 120. The teaching information created or edited via the operation part 135 is output and stored in the storage device 124 of the robot controller 120. Further, according to this embodiment, the teaching information created or edited via the operation part 135 is transferred and stored in the teaching information database 2030 described later of the central server 200 in association with work information (described later) of the robot 110 that moves based on the teaching information (details described later). Further, the instructor suitably operates this operation part 135 and inputs search keywords (search condition information) and the like related to the usage of the robot 110 in order to search (details described later) for teaching information in the teaching information database 2030 described later of the central server 200 (details described later).

The display part 136 comprises a liquid-crystal display or the like, for example, and displays various information.

The large-capacity storage device 134 comprises an HDD and the like, for example, and stores various information and the like. For example, the large-capacity storage device 134 stores search algorithms for searching for teaching information in the teaching information database 2030 described later of the central server 200, using the above described search keywords input via the operation part 135 as key.

Note that while the above has described the work facility 100 of one site that performs the handling work of the work W by the robot 110, at least the robot 110, the robot controller 120, and the PC 130 (each may be a type constituting a structure and configuration that differs from that of the above described site) are disposed as the work facility 100 in other sites that perform the handling work of other work targets and work corresponding to other usages of the robot 110 (such as bolt tightening work, painting work, welding work, communication work, for example) as well in the same manner as in the above described site.

Further, the central server 200 comprises a control part 201, a communication control part 202, and a large-capacity storage device 203 as a functional configuration.

The control part 201 controls the entire central server 200.

The communication control part 202 controls the information communication performed with the robot controller 120 and the PC 130 of each site via the network cloud NW1.

The large-capacity storage device 203 is configured as an aggregate of a plurality of storage media that exist inside the network cloud NW1, and is capable of variably setting the storage capacity and the like. This large-capacity storage device 203 stores the teaching information database 2030 (refer to FIG. 5 described later).

Figure 5:
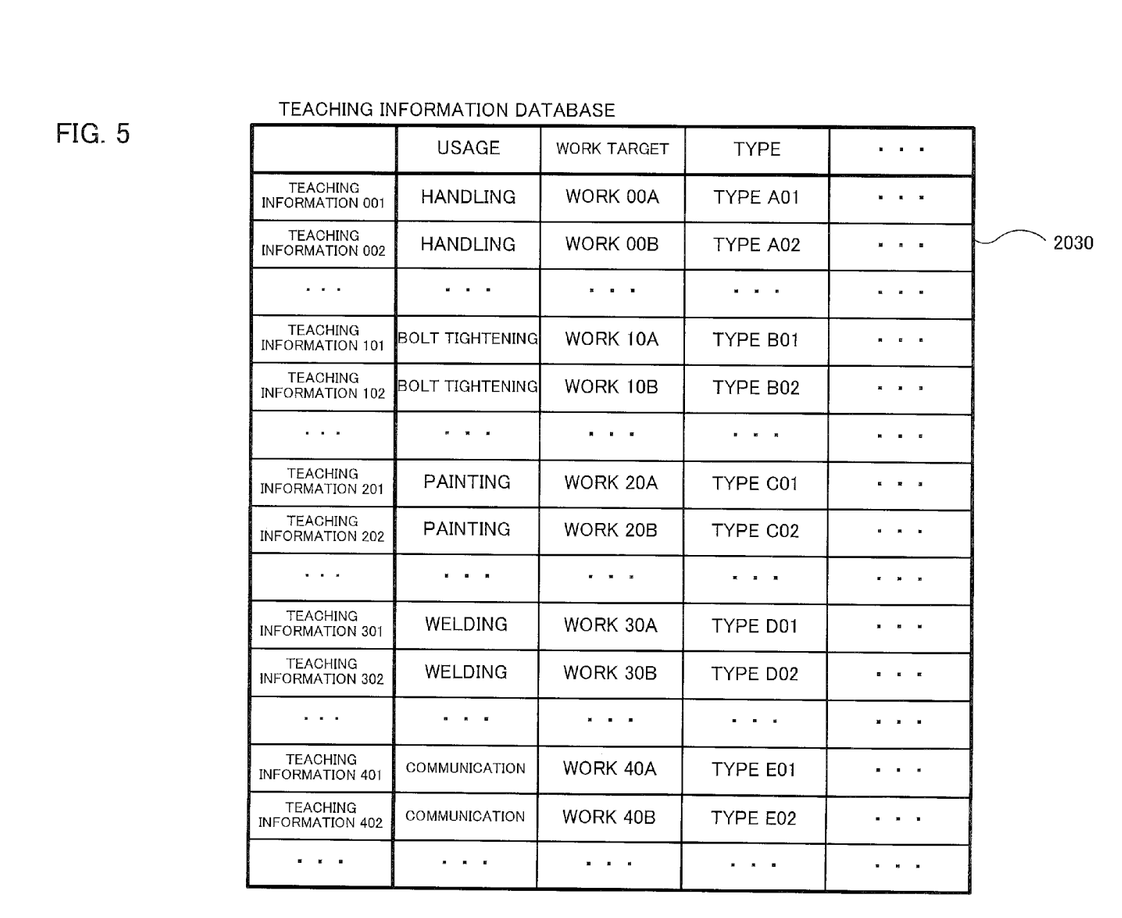
FIG. 5 is a table showing an example of the stored contents of the teaching information database.

As shown in FIG. 5, the teaching information database 2030 stores the teaching information (described as "Teaching information 001" "Teaching information 002" . . . in FIG. 5) that regulates the movement of the plurality of types of the robots 110 in association with the work information of the robot 110.

The teaching information includes, for example, information that indicates the type of the tool 112 used, information that indicates the movement mode with respect to the work target by the tool 112, information indicating the movement speed of the robot 110, and the like, for example.

The work information includes usage information that indicates the usage of the robot 110 (described as "Handling" . . . in FIG. 5), work target information that indicates the type, shape, and the like of the work target of the robot 110 (described as "Work 00A" . . . in FIG. 5), type information that indicates the type of the robot 110 (described as "Type A01" . . . in FIG. 5), and the like, for example. The work information, such as the usage information, work target information, and type information, serves as so-called metadata of the teaching information when a search for teaching information is conducted using the PC 130 of each site. That is, when a search for teaching information is conducted, the search result is output according to the relevance between the work information, such as the usage information, work target information, and type information associated with the teaching information, and the above described search keywords, and not according to the contents of the teaching information themselves (details described later).

Figure 6:
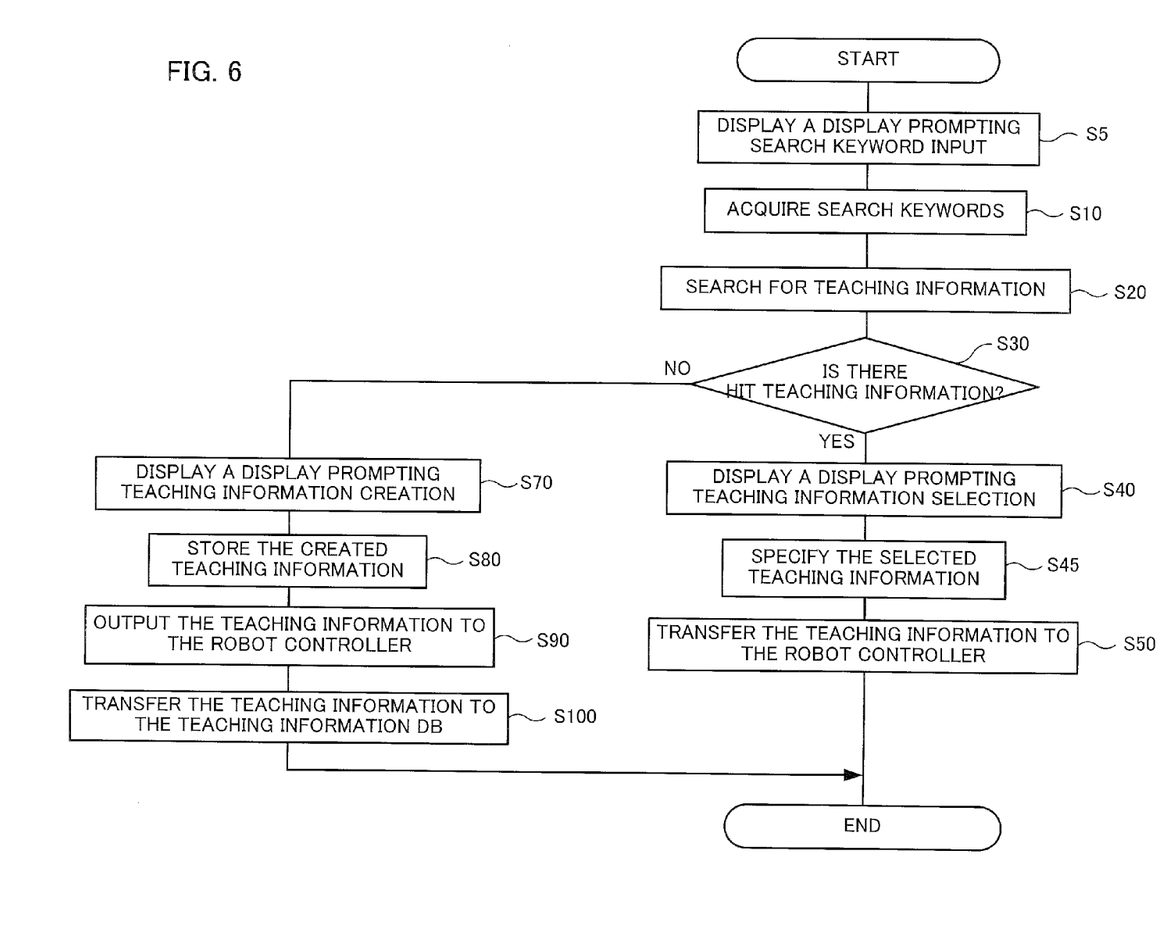
FIG. 6 is a flowchart showing an example of the control procedure executed by the control part of the PC provided in each site.

The following describes an example of the control procedure executed by the control part 131 of the PC 130 disposed in each site, using FIG. 6.

In FIG. 6, the processing shown in this flow is started by a predetermined start operation (power ON of the PC 130, for example). First, in step S5, the control part 131 of the PC 130 displays a display that prompts the instructor to input the above described search keywords to the display part 136. Note that the search keywords are not limited to one word, and may be a plurality of words. When the instructor associated with this display inputs search keywords by suitably operating the operation part 135, in step S10, the control part 131 acquires the search keywords input via the operation part 135, and the flow proceeds to step S20.

In step S20, the control part 131 accesses the above described teaching information database 2030 via the communication control part 132, the network cloud NW1, and the communication control part 202 of the central server 200. Then, the control part 131 searches all teaching information stored in the teaching information database 2030 for teaching information highly relevant to the search keywords acquired in the above described step S10, that is, the teaching information associated with the above described work information that matches the search keywords. The procedure of this step S20 links to a searching part. For example, in a case where the search keyword is "Handling," the control part 131 searches the teaching information stored in the teaching information database 2030 for teaching information that includes the "Handling" concept (words, etc.) in associated work information (usage information). Note that the search in this step S20 is executed based on the above described search algorithms stored in the large-capacity storage device 134.

Subsequently, in step S30, the control part 131 determines whether or not there was teaching information hit in the search in the above described step S20. In a case where there was teaching information hit in the search, the condition of step S30 is satisfied, and the flow proceeds to step S40.

In step S40, the control part 131 displays the search results in the above described step S20, that is, the teaching information hit in the above described search along with the associated work information, for example. Further, along with this, the control part 131 displays a display that prompts the instructor to select teaching information. When the instructor associated with this display selects the desired teaching information by suitably operating the operation part 135, in step S45, the control part 131 specifies the teaching information selected via the operation part 135, and the flow proceeds to step S50.

In step S50, the control part 131 acquires the teaching information specified in the above described step S45 from the teaching information database 2030 via the communication control part 202 of the central server 200 and the network cloud NW1, by the communication control part 132. Then, the control part 131 transfers and stores the acquired teaching information in the storage part 124 of the robot controller 120 via the second input/output part 123b of the robot controller 120 by the input/output part 133. The procedure of this step S50 links to a first transferring part. Subsequently, the processing shown in this flow ends.

On the other hand, in the above described step S30, if there was no teaching information hit in the search in the above described step S20, the condition of step S30 is not satisfied and the flow proceeds to step S70.

In step S70, the control part 131 displays the search results in the above described step S20, that is, that there was no teaching information hit in the above described search, on the display part 136. Further, along with this, the control part 131 displays a display that prompts the instructor to create teaching information. When the instructor associated with this display creates the teaching information by suitably operating the operation part 135, in step S80, the control part 131 stores (holds) the teaching information created via the operation part 135 in memory (not shown) such as ROM or the like, for example, and the flow proceeds to step S90.

In step S90, the control part 131 outputs and stores the teaching information stored in memory in the above described step S80 in the storage device 124 of the robot controller 120 via the second input/output part 123b of the robot controller 120 by the input/output part 133.

Then, the flow proceeds to step S100 where the control part 131 transfers and stores the teaching information stored in memory in the above describes step S80 in the above described teaching information database 2030 via the network cloud NW1 and the communication control part 202 of the central server 200 by the communication control part 132, in association with the work information of the robot 110 that moves based on the teaching information. The procedure of this step S100 links to a second transferring part. Subsequently, the processing shown in this flow ends.

Then, the control part 121 of the robot controller 120 of each site controls the movement of the robot 110 based on the teaching information stored in the storage device 124 as described above (the information may be used as is or after suitable arrangement), causing the robot 110 to execute the work.

In the robot system 1 in this embodiment described above, the teaching information database 2030 of the central server 200 stores a plurality of types of teaching information applicable in each of the plurality of sites (shared by the plurality of sites). Then, in each site, when the instructor operates the operation part 135 of the PC 130 and inputs the search keywords related to the usage of the robot 110, the control part 131 searches the plurality of types of teaching information stored in the teaching information database 2030 for teaching information highly relevant to the search keywords. Then, if there was teaching information hit in the search, when the instructor operates the operation part 135 of the PC 130 and selects the desired teaching information, the selected teaching information is transferred from the teaching information database 2030 to the storage device 124 of the robot controller 120 of this site. With this arrangement, the robot controller 120 controls the movement of the robot 110 based on the teaching information, making it possible to cause the robot 110 to execute the work.

As described above, according to this embodiment, the instructor can find desired teaching information, that is, teaching information associated with the usage of the robot 110, in the teaching information database 2030 by simply performing a simple operation using the PC 130. With this arrangement, the teaching work performed by the instructor can be shortened or simplified. As a result, it is possible to decrease the labour burden of the instructor in relation to teaching work, and improve instructor convenience.

Further, in particular, according to this embodiment, the teaching information created via the operation part 135 of the PC 130 is transferred to the teaching information database 2030 in association with the work information of the robot 110 that moves based on the teaching information. With this arrangement, it is possible to accumulate teaching information in the teaching information database 2030 and increase the variations of teaching information inside the teaching information database 2030. As a result, the number of sites to which the teaching information stored in the teaching information database 2030 is applicable increases, making it possible to improve the versatility of the teaching information database 2030.

Further, in particular, according to this embodiment, the work information of the robot 110 includes the usage information and work target information of the robot 110, and the teaching information database 2030 stores a plurality of types of teaching information in association with the usage information and the work target information of the robot 110. With this arrangement, the instructor can operate the operation part 135 of the PC 130, input the search keywords related to the usage and work target of the robot 110, and execute the aforementioned search. As a result, it is easier for the instructor to find desired teaching information, making it possible to further improve instructor convenience.

Note that the embodiments are not limited to the above, and various modifications may be made without deviating from the spirit and scope of the disclosure. For example, according to the above described embodiment, in step S50, the control part 131 of the PC 130 acquires the teaching information specified in step S45 from the teaching information database 2030, and transfers and stores the acquired teaching information in the storage device 124 of the robot controller 120. Nevertheless, the present disclosure is not limited thereto, allowing the control part 131 of the PC 130 to control the communication control part 202 of the central server 200 so that the teaching information specified in step S45 is transferred from the teaching information database 2030 and stored in the storage device 124 of the robot controller 120. In this case, the procedure for transferring the above described teaching information of the communication control part 202 of the central server 200 links to the first transferring part.

While, in the above, the large-capacity storage device 203 of the central server 200 shared by the work facilities 100 of the plurality of sites is made to store the teaching information database 2030 that stores teaching information as an example of technical information (know-how), the present disclosure is not limited thereto. For example, the large-capacity storage device 203 of the central server 200 may be made to store a database that stores other technical information.

Further, the flow shown in the above described FIG. 6 is not limited to the procedures shown in the embodiments, allowing procedures to be added, deleted, and changed in order without deviating from the spirit and scope of the disclosure.

Further, other than that already stated above, techniques based on the above described embodiment may be suitably utilized in combination as well.

Although other examples are not individually described herein, various changes can be made according to the above described embodiments and the like without deviating from the spirit and scope of the disclosure.

What is claimed is:

1. A robot system comprising one or more work facilities comprising a robot, a robot controller and a tool changer, the robot comprising an arm and a tool attached to a tip end of the arm, the robot controller comprising a storage device configured to store teaching information, including tool information which indicates a kind of the tool, for regulating a movement of the robot and being configured to control the movement, including a replacement movement of the tool, of the robot based on the teaching information stored in the storage device, the tool changer being disposed near the robot and being used for replacing the tool; and a teaching information database which is data-communicably connected to each of the one or more work facilities and stores a plurality of types of the teaching information associated with work information including at least usage information of the robot, each of the one or more work facilities including an interface device configured to receive an input of search condition information related to a usage of the robot, to search teaching information relevant to the search condition information inputted among the plurality of types of teaching information stored in the teaching information database, and to receive a selection of desired teaching information among one or more sets of the teaching information hit in the search, the interface device is configured to
transfer the teaching information selected by the interface device from the teaching information database to the storage device of a corresponding work facility of the one or more work facilities,
receive an input of the teaching information including the tool information when there is no teaching information hit in the search, and
transfer the received input teaching information from the work facility to the teaching information database in association with the work information of the robot configured to perform the movement including the replacement movement of the tool based on the teaching information.

2. The robot system according to claim 1, wherein the interface device is further configured to
receive an input of the search condition information;
search the teaching information relevant to the input search condition information among the plurality of types of teaching information stored in the teaching information database, and
receive the selection of desired teaching information among one or more sets of the teaching information hit in the search, and
transfer the selected teaching information from the teaching information database to the storage device of the corresponding work facility of the one or more work facilities.

3. The robot system according to claim 2, wherein the work information includes work target information of the robot in addition to the usage information.

4. A robot controller configured to control a movement of a robot comprising an arm and a tool attached to a tip end of the arm, the tool configured to be replaced by a tool changer disposed near the robot, the robot controller being connected to a teaching information database and an interface device, the robot controller comprising a storage device configured to store teaching information, including tool information which indicates a kind of the tool, for regulating a movement of the robot provided in a work facility, the teaching information database being data-communicably connected to each of one or more of the work facilities and storing a plurality of types of the teaching information associated with work information including at least usage information of the robot, the interface device being configured to receive an input of search condition information related to a usage of the robot, to search teaching information relevant to the search condition information inputted among the plurality of types of teaching information stored in the teaching information database, to receive a selection of desired teaching information among one or more sets of the teaching information hit in the search, to receive an input of the teaching information including the tool information when there is no teaching information hit in the search, and to transfer the teaching information input from the work facility to the teaching information database in association with the work information of the robot configured to move based on the teaching information, the robot controller being configured to control the movement including a replacement movement of the tool of the robot based on the teaching information selected by the interface device and transferred from the teaching information database to the storage device.

5. A robot system comprising
one or more work facilities comprising a robot, a robot controller and a tool changer, the robot comprising an arm and a tool attached to a tip end of the arm, the robot controller comprising a storage device configured to store teaching information, including tool information which indicates a kind of the tool, for regulating a movement of the robot and being configured to control the movement, including a replacement movement of the tool, of the robot based on the teaching information stored in the storage device, the tool changer being disposed near the robot and being used for replacing the tool; and a teaching information database which is data-communicably connected to each of the one or more work facilities and stores a plurality of types of the teaching information associated with work information including at least usage information of the robot;

each of the one or more work facilities including an interface device including means for receiving an input of search condition information related to a usage of the robot, for searching teaching information relevant to the search condition information inputted among the plurality of types of teaching information stored in the teaching information database, and for receiving a selection of desired teaching information among one or more sets of the teaching information hit in the search; and, the interface device comprising
means for transferring the teaching information selected by the interface device from the teaching information database to the storage device of a corresponding work facility of the one or more work facilities;

means for receiving an input of the teaching information including the tool information when there is no teaching information hit in the search; and means for transferring the teaching information input by the means for receiving from the work facility to the teaching information database in association with the work information of the robot configured to perform the movement including the replacement movement of the tool based on the teaching information.

6. The robot system according to claim 1, wherein
the interface device is configured to cause a display to display a request for the input of the teaching information when there is no teaching information hit in the search in response to a determination that no teaching information is hit in the search.

7. The robot controller according to claim 4, wherein
the interface device is configured to cause a display to display a request for the input of the teaching information when there is no teaching information hit in the search in response to a determination that no teaching information is hit in the search.

8. The robot system according to claim 5, wherein
the means for receiving an input of the teaching information selected by the interface device is configured to cause a display to display a request for the input of the teaching information when there is no teaching information hit in the search in response to a determination that no teaching information is hit in the search.

\* \* \* \* \*